(12) United States Patent
Larosa et al.

(10) Patent No.: US 9,071,158 B2
(45) Date of Patent: Jun. 30, 2015

(54) POWER SUPPLY APPARATUS FOR AN ELECTRICAL APPLIANCE

(71) Applicant: STMicroelectronics S.r.l., Agrate Brianza (MB) (IT)

(72) Inventors: Roberto Larosa, Catania (IT); Giulio Zoppi, Palermo (IT); Natale Aiello, Trecastagni (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 166 days.

(21) Appl. No.: 13/969,637

(22) Filed: Aug. 19, 2013

(65) Prior Publication Data

US 2014/0056040 A1   Feb. 27, 2014

(30) Foreign Application Priority Data

Aug. 21, 2012  (IT) .............................. MI2012A1436

(51) Int. Cl.
| | | |
|---|---|---|
| H01H 47/00 | (2006.01) | |
| H02M 1/36 | (2007.01) | |
| H02J 9/00 | (2006.01) | |
| H02M 3/335 | (2006.01) | |
| H02M 1/00 | (2007.01) | |

(52) U.S. Cl.
CPC ............ *H02M 1/36* (2013.01); *H02M 3/33523* (2013.01); *H02J 9/005* (2013.01); *H02M 2001/0006* (2013.01); *H02M 2001/0032* (2013.01); *Y02B 70/16* (2013.01)

(58) Field of Classification Search
CPC ........... H05B 37/0272; H05B 33/0854; H05B 33/0809; H02J 9/065; H02J 9/02
USPC ......... 363/16, 17, 21.07, 21.08, 21.12, 12.17, 363/21.18; 398/202
See application file for complete search history.

(56) References Cited

U.S. PATENT DOCUMENTS

| | | | | |
|---|---|---|---|---|
| 5,914,865 | A  * | 6/1999 | Barbehenn et al. | 363/21.15 |
| 6,252,783 | B1 * | 6/2001 | Huh et al. | 363/21.01 |
| 7,840,142 | B2 * | 11/2010 | Keller | 398/202 |
| 7,880,393 | B2 * | 2/2011 | Wong et al. | 315/149 |
| 8,933,592 | B2 * | 1/2015 | Aiello | 307/125 |

FOREIGN PATENT DOCUMENTS

| | | |
|---|---|---|
| EP | 1239577 A2 | 9/2002 |
| WO | WO-0036830 A1 | 6/2000 |
| WO | WO-2006011032 A1 | 2/2006 |

OTHER PUBLICATIONS

Italian Search Report and Written Opinion dated Apr. 25, 2013 for IT MI2012A001436 (7 pages).

* cited by examiner

*Primary Examiner* — Rajnikant Patel
(74) *Attorney, Agent, or Firm* — Gardere Wynne Sewell LLP

(57) ABSTRACT

A power supply apparatus includes a power supply circuit and a power-on circuit. The power-on circuit detects a remotely transmitted control signal and causes a transition of the power supply circuit to a turned on state. The power-on circuit includes a transducer configured to provide a power-on signal in response to the remote control signal. The transducer triggers transition to the turned on state through a switch driven by the power-on signal output from the transducer and arranged to supply a power supply circuit enable signal. A DC blocking capacitor is connected between an output of the transducer and a control terminal of the switch.

16 Claims, 5 Drawing Sheets

POWER SUPPLY APPARATUS FOR AN ELECTRICAL APPLIANCE

PRIORITY CLAIM

This application claims priority from Italian Application for Patent No. MI2012A001436 filed Aug. 21, 2012, the disclosure of which is incorporated by reference.

TECHNICAL FIELD

The present disclosure relates to a power supply apparatus for an electrical appliance.

BACKGROUND

As is known, many electrical or electronic appliances envisage a slow-consumption mode of operation, referred to as "stand-by mode". In this mode, the electrical appliance is inactive as regards its normal operation (for example, display of images for a television set, sound reproduction for hi-fi equipment, etc.) but can be controlled in switching-on through a remote control. As is generally known, an electrical appliance in stand-by mode is in any case supplied through the electric-supply mains, such as domestic power. The energy consumption is due to the presence of a microcontroller, configured to receive and process possible commands issued by a remote controller and supplied for this purpose.

Considerable efforts have been made in the last years to limit current consumption in stand-by mode of electrical appliances, which, so far, generally have levels of consumption of a few watts. However, it is evident that, if the consumption in stand-by mode of a plurality of electrical appliances generally present in dwellings is considered, non-negligible daily consumption levels may be reached.

It is known from PCT Application No. WO2010/106113 (the disclosure of which is incorporated by reference), and shown in FIG. 1 herein, a power supply circuit for an electrical appliances. The power supply circuit 30 in FIG. 1, in particular a switch-mode power supply (SMPS) circuit of a flyback type, comprises a remotely activated start-up circuit 32 connected to a capacitor 18, which is in turn connected to a ground reference voltage GND. The start-up circuit 32 comprises a turn-on transistor 15 and a transducer 33, which can be remote-controlled and is configured to power-on, when activated, passage of a current there though. The transducer 33 is connected between a drain terminal D and a gate terminal G of the turn-on MOS transistor 15. The transducer 33 can be a photodiode configured so as to power-on passage of a current through it if activated by a light beam at a particular wavelength or within a range of wavelengths. The turn-on circuit 32 also comprises a turn-off resistor 34 connected between the gate terminal G and the source terminal S of the turn-on transistor 15; finally a Zener diode 35 is connected between the gate terminal G and the source terminal S of the turn-on transistor 15, in parallel to the turn-off resistor 34.

SUMMARY

One aspect of the present disclosure is to provide a power supply apparatus wherein the circuit performances are improved with respect to the prior art. Particularly the power supply apparatus provides improved circuit performances of the power-on circuit of the power supply apparatus itself.

One aspect of the present disclosure is a power supply apparatus for an electrical appliance comprising a power supply circuit and a power-on circuit of the power supply circuit, said power-on circuit being configured for determining a transition from a turned off state, wherein said power supply circuit is off and does not supply electric power, to a turned on state of said power supply circuit, said power-on circuit comprising a transducer of a remote-controlled type configured to provide an power-on signal to trigger said transition in response to a reception of a wireless signal, said power-on circuit comprising a switch arranged in the electric path between an external DC supply line and the output terminal of the power-on circuit, said switch being driven by the transducer, wherein said power-on circuit comprises a capacitor arranged between the output terminal of the transducer and the driving terminal of the switch and configured so that the switch is not DC coupled with the transducer.

BRIEF DESCRIPTION OF THE DRAWINGS

For a better understanding of the present invention, preferred embodiments thereof are now described, purely by way of non-limiting example and with reference to the annexed drawings, wherein.

DETAILED DESCRIPTION OF THE DRAWINGS

Figure 1:
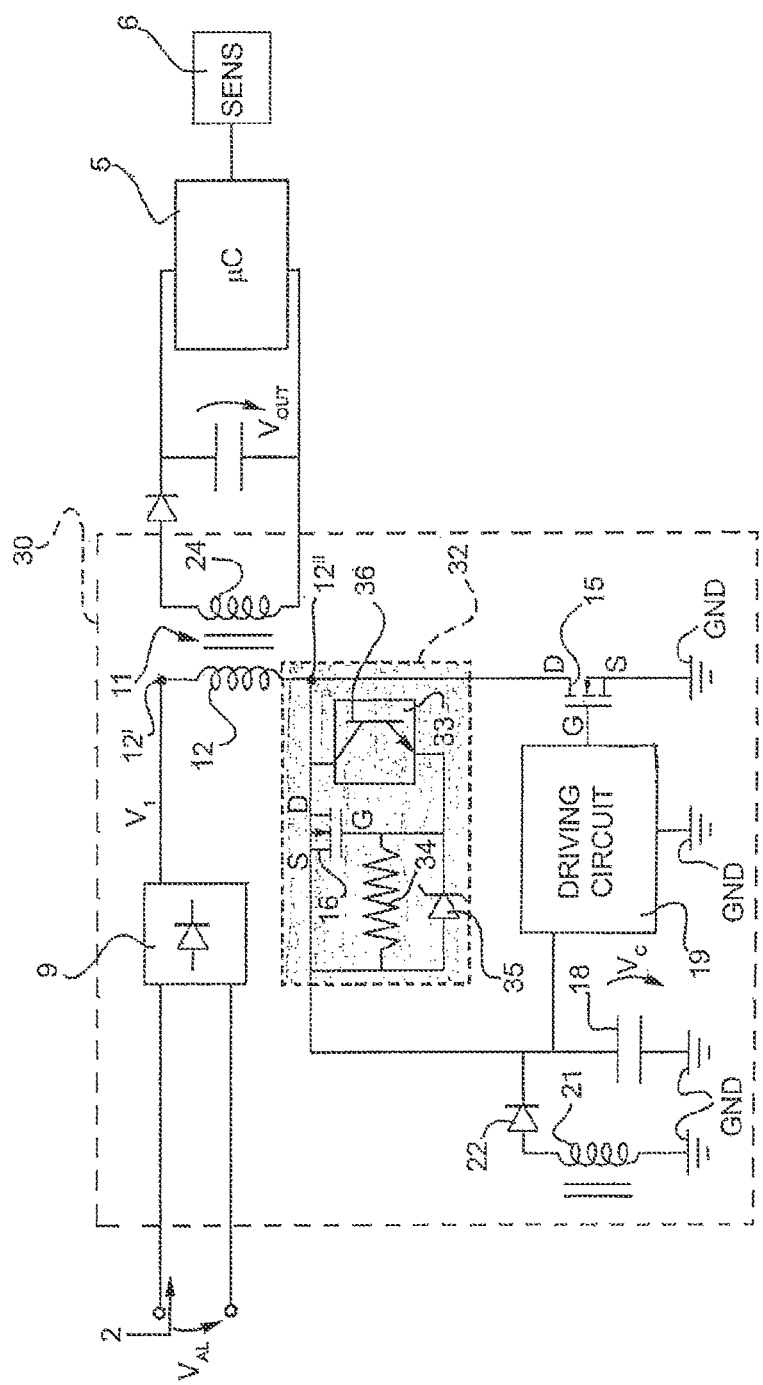
FIG. 1 shows a switch-mode power supply circuit of a known type for managing remote turning-on of an electrical appliance.
Figure 2:
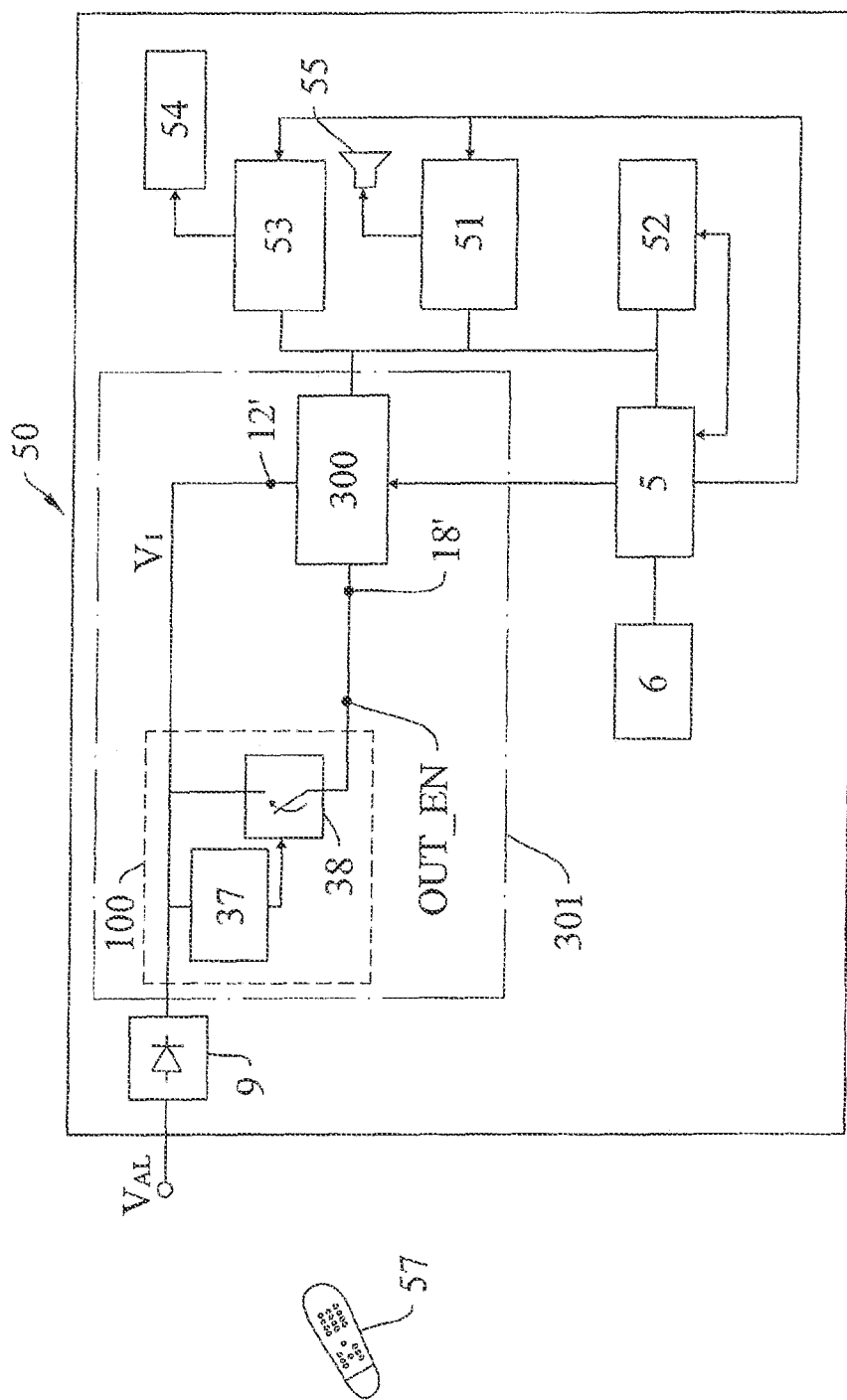
FIG. 2 shows a functional block diagram of an electrical appliance that implements a power supply apparatus.

FIG. 2 shows a functional block diagram of an electrical appliance 50 and a remote control 57. The electrical appliance 50 may, for example, be an audio/video system such as a television set, a hi-fi system, a video recorder, or an electrical household appliance in general, which implements a power supply apparatus 300. In particular, the remote control 57 is configured for issuing an appropriate power wireless signal for the remote activation of a transducer of the power supply apparatus 301, in order to turn-on the electrical appliance 50.

The electrical appliance 50 of FIG. 2 is supplied by means of the power supply apparatus 301 comprising a main power supply circuit 300, for example a switch-mode power supply (SMPS) circuit of a flyback type, coupled with the electric-supply line Val by means of a rectifier 9, for example a diode rectifier bridge with a filter capacitor. The rectifier 9 is connected to the supply line Val and outputs a DC working voltage $V_1$ which is at the input supply terminal 12' of the main power supply circuit 300.

The power supply apparatus comprises a power-on circuit 100 of the power supply circuit 300. The power-on circuit 100 is arranged between the DC working voltage $V_1$ and the power-on terminal 18' of the power supply circuit 300.

The power-on circuit 100 is preferably external to the supply circuit 300, but may be integrated with the same supply circuit 30, and is configured to provide a power on signal through an output terminal OUT_EN to the supply circuit 300 through said power on terminal 18', separated from said input supply terminal 12'.

The electrical appliance 50 then comprises: a microcontroller 5, which is connected to the power supply circuit 300 from which it receives the supply, and communicates with a command sensor 6; a sound-reproducing circuit 51, which is connected to the power supply circuit 300 from which it receives the supply, and communicates with the microcontroller 5 and with one or more loudspeakers 55; optionally a memory 52, which is connected to the power supply circuit 30 from which it receives the supply, and communicates with the microcontroller 5, for storing possible programming information of the electronic appliance 50; and, optionally, a video-reproducing circuit 53, which is connected to the power supply circuit 300 from which it receives the supply, and communicates with the microcontroller 5 and is configured for managing display of graphic information or images on a display 54.

The power-on circuit 100 processes the power on signal emitted by the remote control 57 so as to determine a transition from a turned off state, wherein said power supply circuit 300 is off and does not supply electric power, to a turned on state of said power supply circuit. The power-on circuit comprises a transducer 37 of a remote-controlled type configured to provide a power-on signal OUT_EN to trigger said transition in response to a reception of a wireless power signal deriving from the remote control 57.

Figure 3:
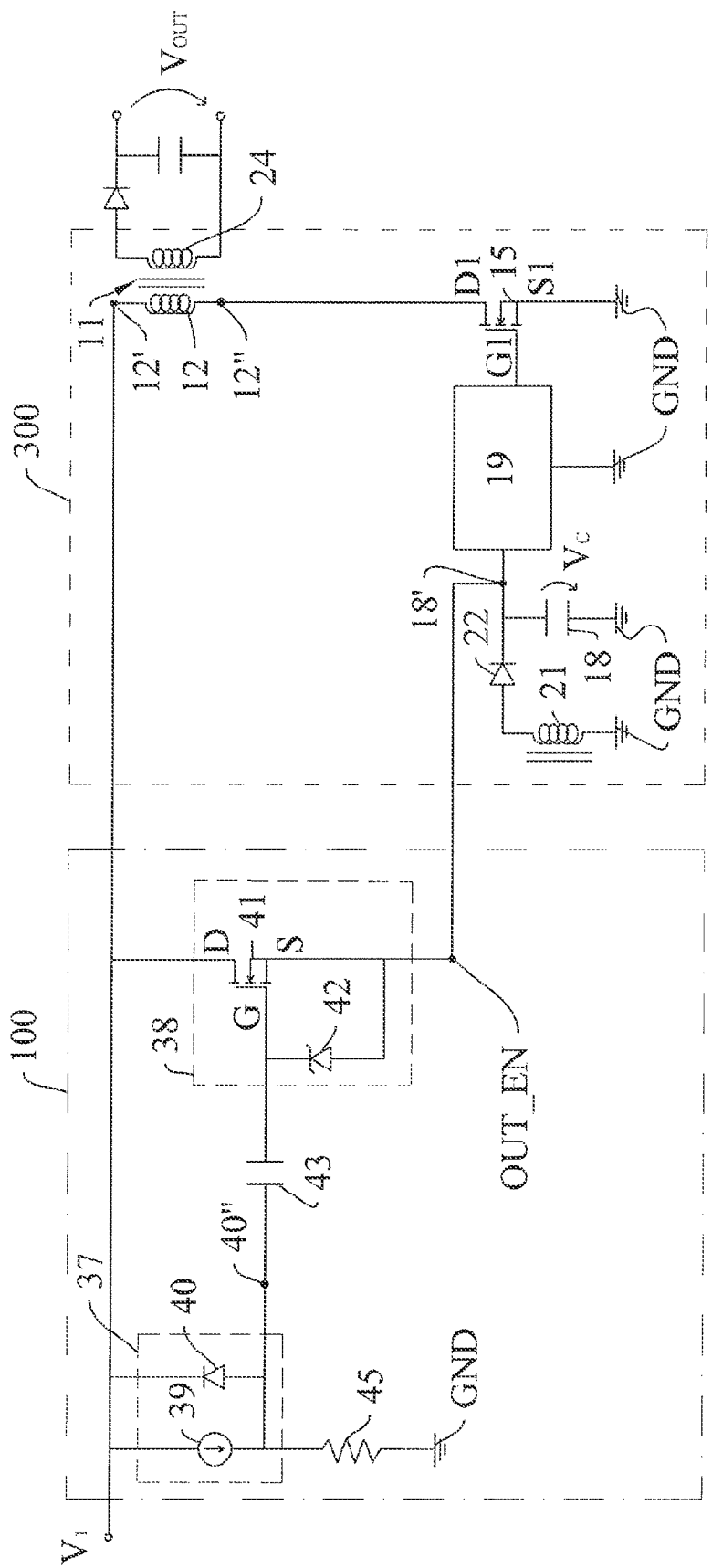
FIG. 3 shows a power supply apparatus for an electrical appliance according to a first embodiment of present disclosure.

FIG. 3 shows in more detail the power supply apparatus 301 for an electrical appliance according to a first embodiment of present disclosure. The DC working voltage $V_1$ is supplied in input to the power supply circuit 300, particularly to a primary winding 12 of a transformer 11. The primary winding 12 comprises the terminal 12' connected to the rectifier 9 and another second terminal 12". The second terminal 12" is connected in series to a not drivable terminal D1 of a switch 15, for example the drain of a MOS device, the other not drivable terminal S1 (for example, the source) of which is connected to ground GND.

The switch 15 is controlled in conduction and interdiction by a driving circuit 19 the output terminal of which is connected with the drivable terminal G1, that is the gate terminal of the MOS transistor 15. The driving circuit 19 is moreover connected, through an input terminal thereof, to the input power-on terminal 18'; therefore the power-on circuit 100 directly controls the driving circuit 19 of the switching transistor of the supply circuit 300. A turn-on capacitor 18 is also connected between said power-on terminal 18' and ground GND; from said capacitor 18 the driving circuit 19 receives the supply during its tuning-on step. The input terminal of the driving circuit 19 is moreover connected, via a rectifier diode 22, to an auxiliary winding 21 of the transformer 11, which supplies the driving circuit 19 during use, after the turning-on step.

The power-on circuit 100 comprises transducer 37, preferably a light sensor, which drives a switch 38; the switch 38 is connected between the DC supply line $V_1$ and the output terminal OUT_EN, which is normally connected with the input terminal 18' of power supply circuit 300, particularly with the common terminal of the capacitor 18 and the input terminal of the driving circuit 19.

The light sensor 37 can be made either by a reverse biased photodiode, or a plurality of photodiodes connected in series one another, or a phototransistor configured so as to power-on passage of current across its terminals if activated by a light beam at a particular wavelength. For simplicity of description, in what follows reference will be made to a photodiode, more precisely which can be activated by an infrared beam.

The photodiode is modeled with a current generator 39, which takes account of the current generated by the infrared beam, in parallel with a diode 40 which describes internal recombination. The switch 38 is made with an high voltage transistor 41, for example of a MOSFET type, and a Zener diode 42, connected between the gate terminal G of the transistor 41 and the output terminal OUT_EN, being said Zener diode 42 able to limit the potential applied to the gate terminal G of the transistor 41 to a maximum value represented by the voltage $V_{ZENER}$, proper to the Zener diode 42.

A resistor 45 is connected between the gate terminal G of the transistor 41 and the ground GND, said resistor 45 being suitable to convert the current generated by the photodiode 37 into a voltage.

Finally the transformer 11 comprises a secondary winding 24 for generating on an output port of the power supply circuit 4 an output voltage $V_{OUT}$ that supplies the microcontroller 5 and others.

In use, with reference to FIG. 3, when the phototransistor 37 is driven in conduction by means of an incident light beam having a wavelength in the infrared, a current flows through it and a voltage develops across its terminal, biasing the gate terminal G of the transistor 41. If the biasing voltage generated by the resistors 45 is higher than the conduction threshold of the turn-on transistor 41, the transistor 41 turns on and the switch 38 closes; the DC working voltage $V_1$ is now sent through the terminal OUT_EN to the input power-on terminal 18' of the supply circuit. In this way, the turn-on capacitor 18 is charged (FIG. 3) and, when the voltage on the turn-on capacitor 18 reaches a value $V_C$ sufficient to supply the driving circuit 19, the driving circuit 19 turns on and drives in conduction the switching transistor 15. Hence, the driving circuit 19 is supplied by the auxiliary winding 21.

After the turning-on step, the driving circuit 19 controls in conduction the switching transistor 15. In this way, a current flows through the primary winding 12 of the transformer 11 and supplies, via the auxiliary winding 21, the driving circuit 19 itself. In use, the switching transistor 15 can be controlled via square-wave modulation (pulse-width modulation—PWM) signal with variable frequency and power-on transfer onto the secondary winding 24 of the supply for operation of the microcontroller 5. The sound-reproducing circuit 51, the memory 52, the video-reproducing circuit 53, the display 54, and the loudspeakers 55 can be supplied by means of respective secondary windings (not illustrated) of the transformer 11 of the power supply circuit 30 of FIG. 2.

The power-on circuit 100 comprises a capacitor 43 coupled between the transducer 37 and the switch 38, particularly to the output terminal 40" of the transducer 37 and the drivable terminal G of the switch 38, particularly the gate terminal G of the MOS transistor 41 of the switch 38; said capacitor 43 is configured so that the transducer 37 is not DC coupled with the switch 38, that is said capacitor 43 has a value such as to ensure that the switch 38, particularly the transistor 41, is not DC coupled with the transducer 37, in this way limiting the circuitry start-up due to the static environmental light.

Figure 4:
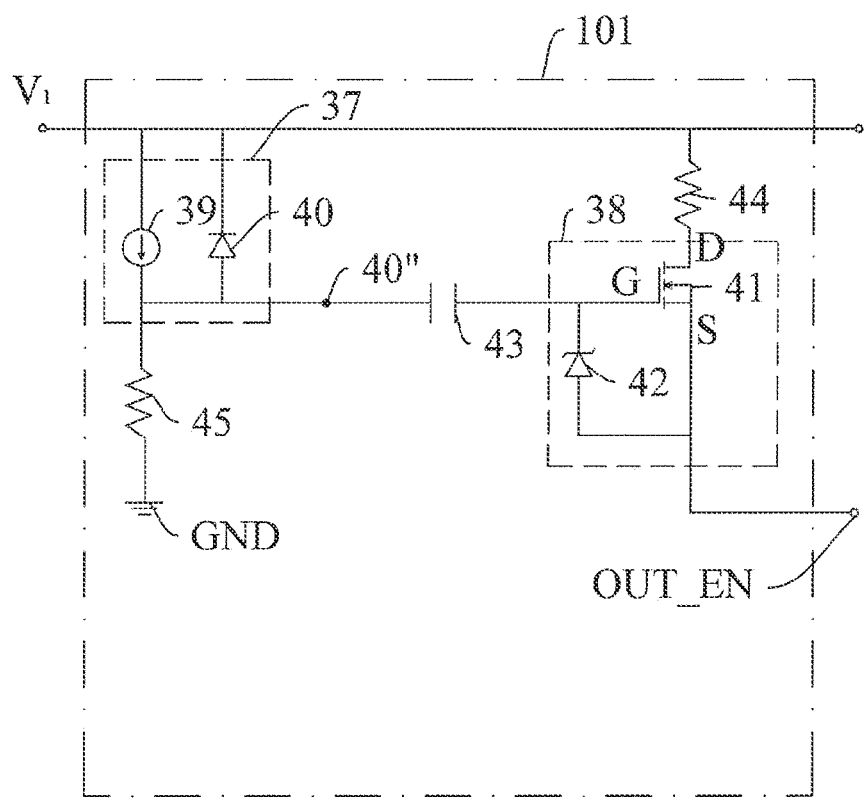
FIG. 4 shows only the power-on circuit of the power supply apparatus for an electrical appliance according to a second embodiment of present disclosure.

FIG. 4 shows only the power-on circuit 101 of the power supply apparatus for an electrical appliance according to a second embodiment of present disclosure; differently from the power-on circuit 101 in FIG. 3, the power-on circuit 101 comprises a resistor 44 connected to the DC supply voltage $V_1$ and the drain terminal D of the transistor 41; the resistor 44 provides to rise up the output voltage at the terminal OUT_EN at small controlled steps, this for limiting the current into the capacitor 18 configured to develop a supply voltage $V_C$ adapted to turn on the power supply circuit 30. A definable number of voltage steps are so needed before the voltage at the input power-on terminal 18' is sufficient to start up the driving circuit 19. In this case, only a well-defined sequence of light events would start up the power supply circuit 30 and not any undesired dynamic light event. Thus, just adding a well-defined resistor 44 would give more immunity to the circuit against undesired light events.

Figure 5:
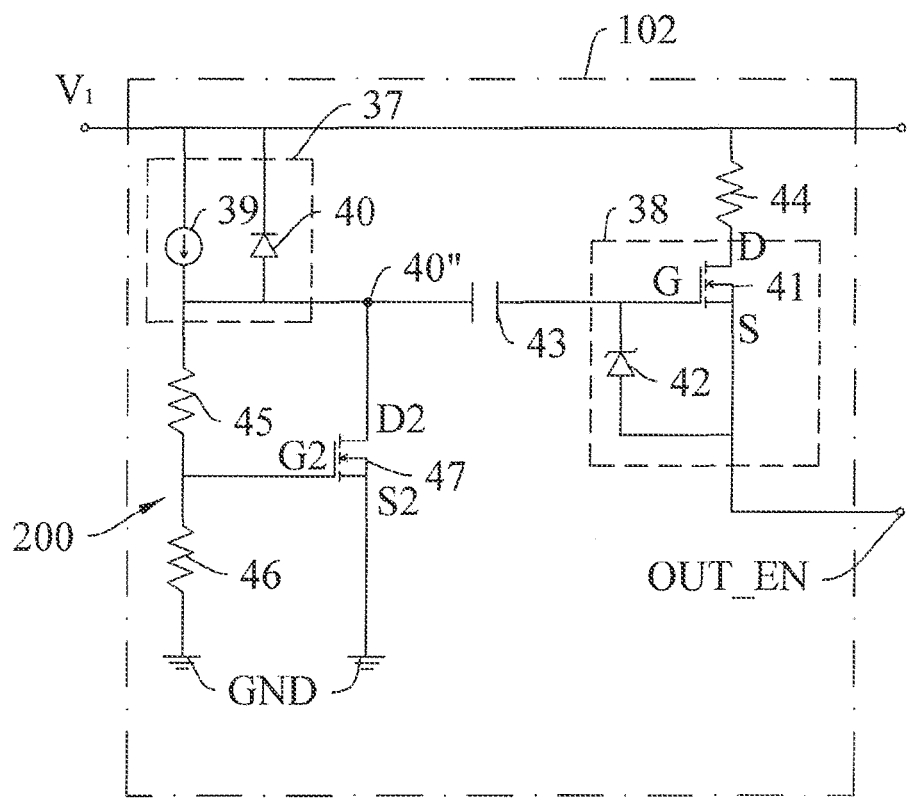
FIG. 5 shows only the power-on circuit of the power supply apparatus for an electrical appliance according to a third embodiment of present disclosure.

FIG. 5 shows only the power-on circuit 102 of the power supply apparatus for an electrical appliance according to a second embodiment of present disclosure; differently from the power-on circuit 101 in FIG. 4, the power-on circuit 102 solves the problem that in some environments, where the power light is so high, the voltage at the node 40" could reach the voltage value $V_1$, thus saturating the receiver. In this case the system cannot respond to any further injection of light through the remote 57. The power-on circuit 102 comprises a negative feedback network 200 (FIG. 5) connected between the output terminal 40" of the transducer and ground GND; the negative feedback network 200 is implemented by adding in series to the resistor 45 a resistor 46 and connecting a transistor 47, for example a MOSFET, so that the gate terminal G2 of the MOS transistor 47 is connected with the common terminal of the resistances 45, 46, the source terminal S2 of the transistor 47 is connected to ground GND and the drain terminal D2 is connected to the terminal 40" of the transducer 37. Transistor 47 will turn on when the photo current is so high that the voltage value at its gate terminal G2 is higher than its voltage threshold. Thus transistor 47 will turn on only when the environment light is higher than a certain value that can be defined case by case. Once the transistor 47 is on, a negative feedback will keep down a node 40" and fixed to a given value. In fact, if the photo current increases also the voltage across the resistor 46 increases and the node 40" is pulled down by the transistor 47. The resistor 44, even if shown in FIG. 5, can belong or cannot belong to the power-on circuit 102.

With the proposed power-on circuit is possible to solve several problems in order to achieve a solid and reliable system able to work under the most diverse light environmental conditions, reducing to zero watt the power consumption of an electronic appliance when in stand-by mode.

What is claimed is:

1. A power supply apparatus for an electrical appliance, comprising:
    a power supply circuit;
    a power-on circuit of the power supply circuit, said power-on circuit configured to determine a transition from a turned off state, wherein said power supply circuit is off and does not supply electric power, to a turned on state of said power supply circuit;
    said power-on circuit comprising a transducer of a remote-controlled type configured to provide a power-on signal to trigger said transition in response to a reception of a wireless signal;
    said power-on circuit further comprising a switch arranged in an electric path between an external DC supply line and an output terminal of the power-on circuit, said switch being driven by the transducer, and further comprising a capacitor arranged between an output terminal of the transducer and a control terminal of the switch and configured so that the switch is not DC coupled with the transducer.

2. The apparatus according to claim 1, wherein said power supply circuit comprises an input power-on terminal and said power-on circuit is external to the power supply circuit and is configured to provide said power-on signal to said input power-on terminal of the power supply circuit through the output terminal of said power-on circuit, said power supply circuit comprising an input supply terminal separated from said power-on terminal and which is connected to an external DC supply line.

3. The apparatus according to claim 1, wherein said transducer comprises a reverse biased photodiode activated by an infrared beam, said photodiode being modeled with a current generator which takes account of the current generated by the infrared beam and a diode which describes internal recombination.

4. The apparatus according to claim 1, wherein said switch comprises a high voltage transistor and a Zener diode, arranged between a control terminal and a first not drivable terminal of said high voltage transistor of the switch, said Zener diode configured to limit the potential applied to the control terminal of said transistor.

5. The apparatus according to claim 1, wherein said power-on circuit comprises a resistor coupled to the control terminal of said switch and to a reference voltage to convert the current generated by the transducer into a voltage.

6. The apparatus according to claim 1, wherein said power-on circuit comprises a resistor arranged so as to connect said switch with said external DC supply line, said resistor configured to limit the current delivered through the output terminal of the power-on circuit.

7. The apparatus according to claim 1, wherein said power-on circuit comprises a negative feedback network coupled to the output terminal of the transducer.

8. The apparatus according to claim 7, wherein said negative feedback network comprises a series of two resistors and a transistor having a control terminal connected to the common terminal of the resistors of the series, a first not drivable terminal coupled to the output terminal of the transducer and a second not drivable terminal connected to a voltage reference, said series of two resistors being coupled between the output terminal of the transducer and said voltage reference.

9. The apparatus according to claim 1, further comprising a remote control configured to generate said wireless signal.

10. A power supply apparatus, comprising:
    a power supply circuit;
    a power-on circuit configured to control transitioning of the power supply circuit from a turned off state to a turned on state;
    said power-on circuit comprising:
        a transducer of a remote-controlled type configured to provide an enable signal triggering transitioning of said power supply circuit in response to a detection of a wireless control signal;
        a transistor switch having a control terminal coupled to receive the enable signal and having a conduction terminal configured to generate a signal control transitioning of the power supply circuit;
        a capacitor coupled between an output of the transducer and the control terminal of the transistor switch.

11. The apparatus according to claim 10, wherein said transducer comprises an infrared photodiode.

12. The apparatus according to claim 10, further comprising a zener diode coupled the control terminal and the conduction terminal.

13. The apparatus according to claim 10, further comprising a resistor coupled between the control terminal of the transistor switch and to a reference voltage node.

14. The apparatus according to claim 10, further comprising a resistor coupled between voltage supply node and an additional conduction terminal of said transistor switch.

15. The apparatus according to claim 10, further comprising a negative feedback network coupled to an output terminal of the transducer.

16. The apparatus according to claim 15, wherein said negative feedback network comprises:
 a voltage divider circuit;
 a transistor having a control terminal coupled to a tap node of the voltage divider circuit, a first conduction terminal coupled to the output terminal of the transducer and a second conduction terminal coupled to voltage reference node.

\* \* \* \* \*